United States Patent
Zacks et al.

(10) Patent No.: US 10,613,969 B2
(45) Date of Patent: Apr. 7, 2020

(54) CODE COVERAGE MODULE WITH TESTING FUNCTION IDENTIFIER

(71) Applicant: Red Hat Israel, Ltd., Raanana (IL)

(72) Inventors: Simcha Dov Zacks, Maalot-Tarshiha (IL); Semion Shtein, Lod (IL)

(73) Assignee: RED HAT ISRAEL, LTD., Raanana (IL)

( * ) Notice: Subject to any disclaimer, the term of this patent is extended or adjusted under 35 U.S.C. 154(b) by 140 days.

(21) Appl. No.: 15/982,418

(22) Filed: May 17, 2018

(65) Prior Publication Data

US 2019/0354468 A1 Nov. 21, 2019

(51) Int. Cl.
*G06F 11/36* (2006.01)

(52) U.S. Cl.
CPC ...... *G06F 11/3688* (2013.01); *G06F 11/3692* (2013.01)

(58) Field of Classification Search
CPC ............ G06F 11/3688; G06F 11/3664; G06F 11/3672; G06F 11/3692; G06F 2009/4557; G06F 2009/4559
See application file for complete search history.

(56) References Cited

U.S. PATENT DOCUMENTS 9,383,973 B2 * 7/2016 Villar ......................... G06F 8/33
9,575,752 B2 * 2/2017 Waugh ....................... G06F 8/77
(Continued)

FOREIGN PATENT DOCUMENTS

CN 107203468 A 9/2017
JP 2015011372 A 1/2015

OTHER PUBLICATIONS

Ying et al., "Predicting Source Code Changes by Mining Revision History", Dep. of Computer Science, U. of British Columbia; IBM T.J. Watson Research Center, http://2004.msrconf.org/papers/Ying.pdf, 5 pgs. (2004).

(Continued)

*Primary Examiner* — Nadeem Iqbal
(74) *Attorney, Agent, or Firm* — Haynes and Boone, LLP; Andrew Ehmke; Calmann Clements

(57) ABSTRACT

Methods, systems, and computer program products are provided to identify a testing function corresponding to a tested function and associate the identity of the testing function with identifiers of one or more lines of source code corresponding to the tested function. A testing function is queued for execution in an execution stack. The testing function calls a function corresponding to one or more lines of a source code, wherein the source code includes instrumentation code corresponds to the function, and wherein the function is queued for execution in the execution stack by the call. The function is executed, and identifiers are retrieved during the execution. The retrieved identifiers correspond to the testing function and to the one or more lines of source code. The identifier corresponding to the testing function is retrieved from the execution stack, and the identifiers corresponding to the one or more lines of source code are retrieved by a code coverage module from one or more hooks corresponding to the instrumentation code. Based on the retrieving during the execution, the identifier of the testing function is associated with the identifiers of the one or more lines of source code. The identifier of the testing function and the identifiers of the one or more lines of source code are stored in a data structure.

20 Claims, 5 Drawing Sheets

(56) References Cited

U.S. PATENT DOCUMENTS

2015/0169321 A1* 6/2015 Rissell ............... G06F 8/71
717/121
2018/0046569 A1* 2/2018 Hisagi ............... G06F 11/3672

OTHER PUBLICATIONS

Bosu et al., "Characteristics of Useful Code Reviews: An Empirical Study at Microsoft", Department of Computer Science, University of Alabama, Tuscaloosa, Alabama; Microsoft Research, Redmond, WA USA, http://cabird.com/pubs/bosu2015useful.pdf, 11 pgs. (2015).
Canfora et al., "Identifying Changed Source Code Lines from Version Repositories", RCOST—Research Centre on Software Technology Department of Engineering—University of Sannio Viale Traiano—82100 Benevento, Italy, 8 pgs. (2007).

* cited by examiner

CODE COVERAGE MODULE WITH TESTING FUNCTION IDENTIFIER

FIELD OF DISCLOSURE

The present disclosure relates generally to data processing and software development, and more specifically to computer program testing and debugging.

BACKGROUND

Software testing provides information about the quality of the software product. Test techniques include the process of executing a program or application to find software bugs, errors, and other types of defects that may cause software to respond incorrectly to inputs, generate incorrect outputs, fail to perform its function, etc.

One type of testing, commonly referred to as white-box testing, tests the internal structures or workings of software using test cases designed to exercise paths through the source code. For example, code coverage testing may be performed to determine if each function, subroutine, statement, branch, or condition in the source code has been called. In most cases, software with a high amount of test coverage is more desirable than software with a low amount of test coverage, as a high amount of test coverage reduces the likelihood that the software would have undetected bugs. However, because of time, budget and other practical constraints, a high amount of test coverage is not always possible. Thus, it is desirable to develop improved testing techniques that can perform code coverage testing in a more efficient and user-friendly way.

SUMMARY

A system of one or more computers can perform particular operations or actions by virtue of having software, firmware, hardware, or a combination thereof installed on the system that in operation causes or cause the system to perform the actions. One or more computer programs can perform particular operations or actions by virtue of including instructions that, when executed by data processing apparatus, cause the apparatus to perform the actions. One general aspect includes a method including: queuing a testing function for execution in an execution stack; calling, by the testing function, a function corresponding to one or more lines of a source code, wherein the source code includes instrumentation code corresponding to the function, and wherein the function is queued for execution in the execution stack by the calling; executing the function, and retrieving during the execution, identifiers corresponding to the testing function and to the one or more lines of source code, wherein an identifier of the testing function is retrieved from the execution stack, and wherein identifiers of the one or more lines of source code are retrieved by a code coverage module from one or more hooks corresponding to the instrumentation code; associating, based on the retrieving during the execution, the identifier of the testing function with the identifiers of the one or more lines of source code; and storing, in a data structure, the identifier of the testing function and the identifiers of the one or more lines of source code. Other examples of this aspect include corresponding computer systems, apparatus, and computer programs recorded on one or more computer storage devices, each to perform the actions of the methods.

One general aspect includes a non-transitory machine-readable medium having stored thereon machine-readable instructions executable to cause a machine to perform operations including: executing a testing function and providing the testing function to an execution stack; calling, by the testing function, a function corresponding to one or more lines of a source code, wherein the source code includes instrumentation code corresponding to the function, and wherein the calling queues the function for execution in the execution stack; executing the function, and retrieving during the execution, an identifier of the testing function and identifiers of the one or more lines of source code, wherein the identifier of the testing function is retrieved from the execution stack, and wherein the identifiers of the one or more lines of source code are retrieved by a code coverage module from one or more hooks corresponding to the instrumentation code; associating, based on the retrieving during the execution, the identifier of the testing function with the identifiers of the one or more lines of source code; and storing, in a data structure, the identifier of the testing function and the identifiers of the one or more lines of source code. Other examples of this aspect include corresponding computer systems, apparatus, and computer programs recorded on one or more computer storage devices, each to perform the actions of the methods.

One general aspect includes a computing system including: a non-transitory memory storing a code coverage module; one or more hardware processors coupled to the non-transitory memory and that execute instructions to cause the system to perform operations including queuing, by a code coverage module, a testing function for execution in an execution stack. The operations also include executing a call of the testing function, wherein the executed call calls a function corresponding to one or more lines of a source code, wherein the source code includes instrumentation code corresponding to the function, and wherein executing the call of the testing function includes queuing the function for execution in the execution stack. The operations also include executing the function, and retrieving during the execution, an identifier corresponding to the testing function and identifiers corresponding to the one or more lines of source code, wherein an identifier of the testing function is retrieved from the execution stack, and wherein identifiers of the one or more lines of source code are retrieved by a code coverage module from one or more hooks corresponding to the instrumentation code. The operations also include associating, based on the retrieving during the execution, the identifier of the testing function with the identifiers of the one or more lines of source code. The operations also include storing, in a data structure, the identifier of the testing function and the identifiers of the one or more lines of source code. Other examples of this aspect include corresponding computer systems, apparatus, and computer programs recorded on one or more computer storage devices, each to perform the actions of the methods.

DETAILED DESCRIPTION

Figure 1:
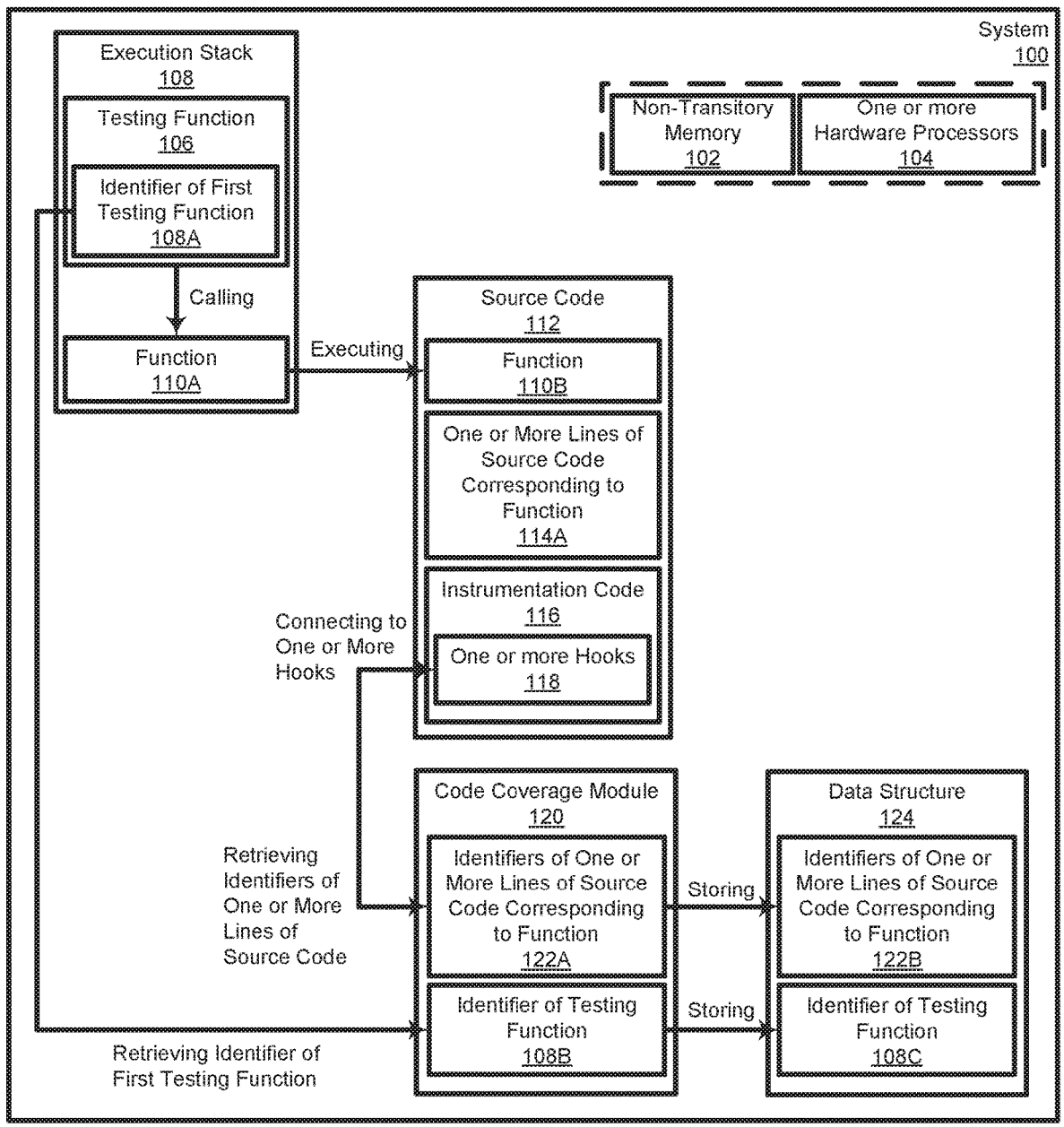
FIG. 1 is an organizational diagram illustrating a system to retrieve and store identifiers of a testing function and of one or more lines of source code corresponding to the function being tested, in accordance with various examples of the present disclosure.

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Code coverage modules can automate execution of tests to eliminate some repetitive tasks. For example, a test automation interface can provide a workspace that includes a command line interface or a graphical user interface and scripts with which a user can interact to perform software testing. User can manipulate the command line or graphical features of the workspace to configure and run software tests.

Software testing generally involves executing different software or system components in order to evaluate different properties of interest, such as efficiency, the correct response to input, or whether the system can run in the user's preferred environment. A typical error that testing may expose is a coding error, but there may be other issues, such as environmental issues as well. There are different styles of software testing, such as unit testing, integration testing, and system testing. Unit testing is performed on particular sections of software code. Integration testing focuses on making sure the interfaces of different components is verified. Finally, system testing is performed to make sure that the system meets its requirements.

It is advantageous for a test execution environment to collect all relevant information corresponding to execution of a binary so that software developers can identify and correct failures. However, setting up such a comprehensive test execution environment so that all possible relevant information is collected is a cumbersome and time consuming process, and requires deep knowledge on the part of software developers to design intelligent tests for each of the software's features that they would like to have tested. Furthermore, traditional code coverage modules generate large amounts of data—although not necessarily the most meaningful data—to help developers troubleshoot failures, but such data dumps distract rather than aid developers in their efforts. For example, in traditional code coverage modules, a developer may only be able to see that a function has generated an error, but may not be able to see the testing function that was used to test the erroneous function. Additionally, storing all of the data gathered by the testing not only uses up the developer's time to review all of the information, but also consumes large amounts of system resources.

The techniques described herein provide solutions to the problems described above with respect to traditional code coverage modules. The techniques provide a way for developers to identify which lines of code are being tested while a testing function is executing, what functions those lines of code correspond to, and which testing function is calling those functions. The testing data, such as identifiers of the testing function, tested function, and lines of code, may then be stored in a data structure such as a database. Such information not only allows developers to verify that the correct testing function is being applied, but also allows the code coverage module to determine, without further input from the developer, what tests need to be run if the source code is later modified based on a comparison of the source code to the modified code and on the data stored in the data structure.

For example, the modified source code may first be compared against the original source code (e.g., using a diff) to determine specifically which lines of code and functions have changed. The code coverage module may analyze the impact to the testing protocol (if any) those changes may have on dependent functions such as calling functions, subroutines, etc. In instances where the changes comprise functions that are the same as the functions in the original set of functions, the code coverage module may query the data structure for the corresponding testing function and automatically test the function using the corresponding testing function. But where the changes comprise new functions, i.e., functions not found in the original set of functions, the code coverage module may determine what the corresponding testing function is, for example by searching for the corresponding testing function in the data structure or in another data structure where the developer has provided that information. Then, the code coverage module may automatically test the new function using the corresponding testing function. In addition to testing the additional or new functions, the code coverage module may also test any dependencies based on the additional or new functions to ensure that the dependencies are not broken by the additional functions. In some examples, such as when efficiency is important, the code coverage module only tests the additional/new functions and their dependent functions using the corresponding testing functions. In other examples, such as when thoroughness is important, the code coverage module tests more than just the additional/new functions and their dependent functions using the corresponding testing functions.

Further, in some examples, the code coverage module may generate visual and/or audible alerts to inform a user that additional and/or new testing functions corresponding to the modified code have been found. The code coverage module may also generate visual and/or audible alerts when additional and/or new tests are being run. In other examples, the code coverage module may generate visual and/or audible alerts to inform a user that additional and/or new functions have been found, but for which no testing functions are defined. Visual/audible alerts include command line or graphical user interface messages, use of special characters, different colors, sounds, flags, etc., to identify the additional and/or new functions and their corresponding testing functions.

As a result of the techniques described herein, relevant testing information is efficiently collected. The testing information may be used to reduce the amount of testing that needs to be done when code is modified, and also to reduce the amount of work required of a developer to configure the code coverage module to perform particular tests, because the code coverage module is able to dynamically determine additional tests to perform based on characteristics of the source code identified during testing. Moreover, by dynamically determining and collecting relevant testing information, system resources can be preserved by avoiding the collection and storing of irrelevant information. Further, the efficiency of the computing systems used to perform the testing is also improved, as testing may be selectively performed on just the additional and/or new functions in the modified code without testing all of the functions again, resulting in less processing, network, and/or storage requirements. And by keeping a user alert to any changes to the testing protocol using visual and/or auditory cues, such as the need to run tests on additional and/or new functions using their corresponding testing functions, user engagement with the code coverage module may be improved.

FIG. 1 is an organizational diagram illustrating a system 100 to retrieve and store identifiers of a testing function and of one or more lines of source code corresponding to the function being tested, in accordance with various examples of the present disclosure.

The system 100 includes non-transitory memory 102 and one or more hardware processors 104.

In more detail regarding the non-transitory memory 102, the non-transitory memory 102 is structured to include at least one machine-readable storage medium on which is stored one or more set of instructions (e.g., software) including any one or more of the methodologies or functions described herein. The non-transitory memory 102 may be structured to include one or more of a read-only memory (ROM), flash memory, dynamic random access memory (DRAM) such as synchronous DRAM (DFRAM), double data rate (DDR SDRAM), or DRAM (RDRAM), and so forth, static memory (e.g., flash memory, static random access memory (SRAM), and so forth), and a data storage device (e.g., a hard disk drive (HDD), solid state drive (SSD), and so forth). Accordingly, any of the operations, steps, and actions of the methods described herein may be implemented using corresponding machine-readable instructions stored on or in the non-transitory memory 102 that are executable by the hardware processor 104.

In more detail regarding the hardware processor 104, the hardware processor 104 is structured to include one or more general-purpose processing devices such as a microprocessor, central processing unit (CPU), and the like. More particularly, the hardware processor 104 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the hardware processor 104 is structured to include one or more special-purpose processing devices such as an application specific integrated circuit (ASIC), a field programmable gate array (FPGA), a digital signal processor (DSP), network processor, and so forth. The hardware processor executes instructions for performing the operations, steps, and actions discussed herein.

The non-transitory memory 102 is structured to store at least one source code 112 that includes function 110B and one or more lines of source code 114A corresponding to the function 110B. The source code 112 may also include instrumentation code 116 having one or more hooks 118. Instrumentation code 116 may be used to monitor or measure the level of the source code's performance and diagnose errors, and may include code for code tracing, debugging, performance counters, event logs, etc. Instrumentation code 116 may therefore include trace code added to the source code 112. For example, a begin trace code and an end trace code may be placed at the beginning and end of function 110B in the source code 112 such that executing the function also executes the trace code. In some examples, the trace code uses hooks to intercept function calls of the traced function, and the trace code may output identifiers of one or more lines of code corresponding to the traced function based on the interception. For example, if the traced function were function 110B, and the corresponding source code line numbers for function 110B were lines 10-14, then the trace code may output "lines 10-14" to a listener. The listener is an object that receives trace output and writes the output to an output device or to data structure 124. In some examples, the trace output is written to a window, a log, a text file, table, database, etc.

The non-transitory memory 102 is also structured to store at least one code coverage module 120 that includes a testing configuration. The testing configuration may be created, for example, by a software developer by inputting pre-defined tests or defining new tests to apply in the code coverage module. The tests are configured to test specified functions corresponding to the source code 112, such as function 110B. Moreover, the tests are configured to access the source code 112 to determine the identifiers 122A of the one or more lines of source code 114A corresponding to the function 110B. The code coverage module 120 may do so by dynamically connecting to or "hooking up" to the one or more hooks 118 of the instrumentation code 116 while the testing function 106 is calling the function 110A and/or executing the function 110B. The code coverage module 120 knows when the testing function 106 is calling the function 110B because the code coverage module 120 also accesses the execution stack 108 when the code coverage module 120 executes the testing function 106.

During the testing, the code coverage module 120 may also access the execution stack 108 to retrieve an identifier 108A of the testing function 106. The identifier 108A retrieved by the code coverage module, identifier 108B, may be the same or different as that of the identifier 108A of the testing function 106. For example, the code coverage module 120 may modify the identifier 108A of the testing function 106 to include a timestamp.

During the testing, the testing function 106 may be loaded to the top of the execution stack 108. As the testing function 106 is executed, the testing function may call function 110A. Such a call would then enter the execution or call stack at a lower level than the testing function 106. In some examples, function 110A may be the same function as function 110B; the "A" nomenclature being used to differentiate the function 110A loaded into the execution stack from the function 110B in the source code 112. In some examples, function 110B is a routine or sub-routine of function 110A that is executed when function 110A is executed.

Because the code coverage module's 120 has access to both the execution stack 108 and the instrumentation code 116 during the testing, the code coverage module 120 is able to correlate one or more lines of source code corresponding to function 110B with the testing function 108A. The code coverage module 120 may then store the identifiers 122A of the one or more lines of source code 114A corresponding to function 110B, and the identifier 108B of the testing function 106 in a data structure 124. The stored form of the identifiers 122A, identifiers 122B, may be the same or different as the identifiers 122A. The stored form of the identifier 108A of the testing function 106, identifier 108C, may be the same or different as identifiers 108A and/or 108B. Examples of data structure 124 include files, tables, databases, arrays, records, strings, lists, containers, graphs, trees, etc., and may include primitive, composite, abstract types.

Figure 2:
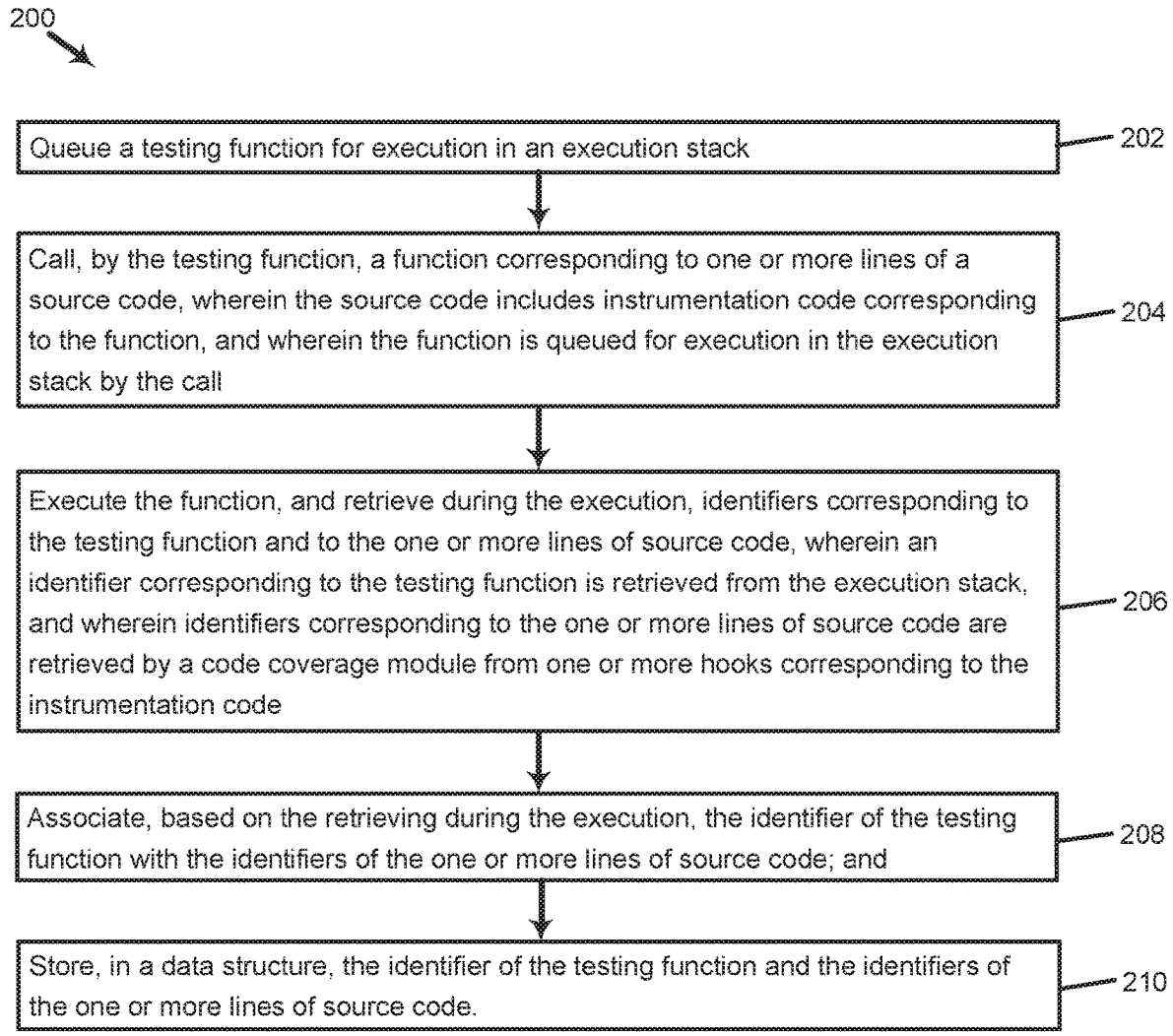
FIG. 2 is a flow diagram illustrating a method performed by a code coverage module to retrieve and store identifiers of a testing function and of one or more lines of source code corresponding to the function being tested, in accordance with various examples of the present disclosure.

FIG. 2 is a flow diagram illustrating a method 200 performed by a code coverage module to retrieve and store identifiers of a testing function and of one or more lines of source code corresponding to the function being tested, in accordance with various examples of the present disclosure. In some examples, the method is performed by executing computer-readable instructions that are stored in non-transitory memory 102 using one or more hardware processors 104 described with respect to FIG. 1. Additional actions may be provided before, during, and after the steps of method 200, and some of the actions described may be replaced, eliminated and/or re-ordered for other examples of the method 200. For example, method 200 may be performed in conjunction with systems 100 and 300 described with respect to FIGS. 1 and 3, and with methods 400 and 500 described with respect to FIGS. 4 and 5.

At action 202, a testing function is queued for execution in an execution stack. The queuing may be performed by a code coverage module executing the testing function, and may be initiated manually, automatically according to a routine or schedule, or event-based, such as upon the detection of a new function in a source code and/or a determination that the testing function is relevant to the new function. When the testing function is queued, the testing function enters into an execution stack at a stack frame. Execution stack frames may be ordered chronologically within the stack, with the earlier-arriving stack frames sitting at the top of the stack, and the later-arriving stack frames sitting at the bottom of the stack. When the stack frame including the testing function reaches the top of the stack, the testing function may be executed.

At action 204, the testing function calls the function. In some examples, the testing function calls the function when the testing function is executed after reaching the top of the stack. The function may correspond to, be included in, or described by one or more lines of the source code. The source code may additionally include instrumentation code, such as tracing code, so that a report of one or more lines of source code corresponding to the function may be generated when the function is executed. When the function is called by the testing function, the function may be queued in the execution stack, albeit at a lower stack frame than the testing function.

At action 206, the function is executed, and identifiers corresponding to the testing function and to the one or more lines of source code are retrieved during the execution. In some examples, an identifier corresponding to the testing function is retrieved from the execution stack. In some examples, identifiers corresponding to the one or more lines of source code are retrieved by a code coverage module from the one or more hooks corresponding to the instrumentation code. In some examples, the code coverage module is connected to the instrumentation code by the one or more hooks.

At action 208, the identifier of the testing function and the identifiers of the one or more lines of source code are associated. In some examples, the association is performed by the code coverage module. In some examples, the association is based on the code coverage module's simultaneous accessing of the execution stack and of the instrumentation code via the one or more hooks as the execution is being executed. Thus, the code coverage module may be able to trace, in real-time from the call stack, the relationship between the testing function and any called functions, routines, and sub-routines. As the tracing is ongoing, the code coverage module, which is also hooked up to the source code via hooks in the instrumentation code, also receives a report from the listener of the line numbers corresponding to each of the called functions. In some examples, the instrumentation code may generate a timestamp for each corresponding line of code, and the code coverage module may also generate a timestamp when a function is called and/or executed by the testing function. Based on the timestamps, the code coverage module may match up the identifier of the testing function with the identifiers of the one or more lines of the source code.

At action 210, the identifier of the testing function and the identifiers of the one or more lines of source code may be stored in a data structure such as a log file, table, array, etc.

Figure 3:
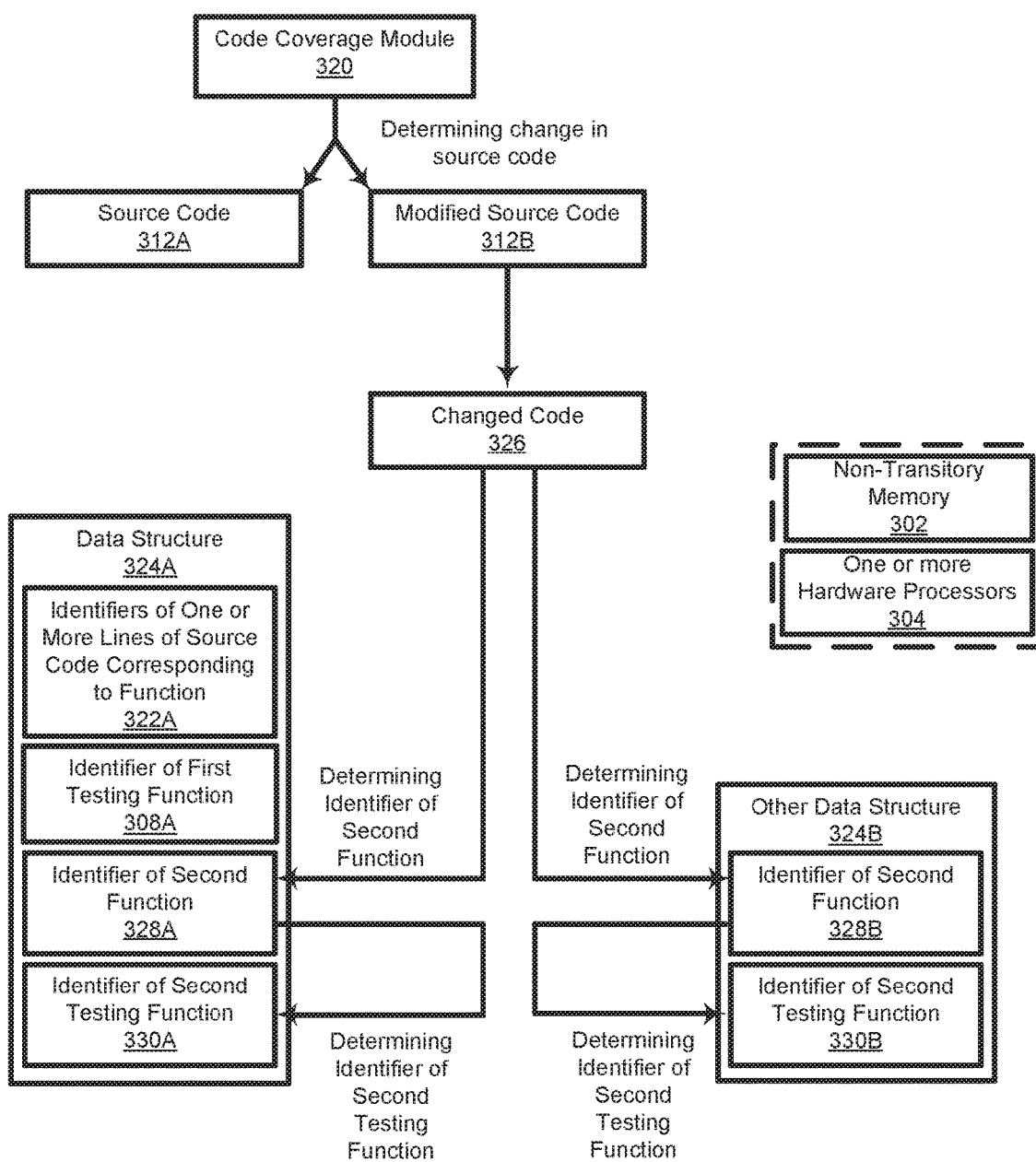
FIG. 3 is an organizational diagram illustrating a system for determining an identifier of a testing function corresponding to a changed function when the original source code has been modified, in accordance with various examples of the present disclosure.

FIG. 3 is an organizational diagram illustrating a system 300 for determining an identifier of a testing function corresponding to a changed function when the original source code has been modified, in accordance with various examples of the present disclosure.

System 300 includes non-transitory memory 302 and one or more hardware processors 304 similar to those described with respect to FIG. 1. The one or more hardware processors 304 executes instructions for performing the operations, steps, and actions discussed herein. The non-transitory memory 302 is structured to store at least one code coverage module 320, source code 312A, modified source code 312B, changed code 326, data structure 324A and another data structure 324B.

The code coverage module 320 may run analyze the source code 312A and the modified source code 312B to determine differences or changes between the source code 312A and the modified source code 312B. In some examples, the code coverage module 320 runs a diff to determine the changes. Based on the analysis, the code coverage module may determine a set of changed code 326. The changed code 326 may include one or more changed functions. In some examples, a function of the source code 312A may have been modified to include additional functions or sub-routines. The additional functions may have been previously declared or described in the source code 312A, and the additional functions may have previously been tested using a first testing function. To determine if this is indeed the case, the code coverage module 320 may look up a data structure 324A, which may have been populated during a previous testing run according to the method described with respect to FIG. 2. The code coverage module may look, for example, for the identifier 328A of the additional function ("second function") and for the identifier 330A of the relevant second testing function. The data structure 324A may also include the identifiers 322A of one or more lines of source code corresponding to functions previously tested. Each of the functions previously tested may have an identifier. For example, a first testing function of the functions previously tested may have identifier 308A. The code coverage module 320 may compare the identifier of the first testing function 308A with the identifier of a corresponding second testing function 330A to determine if the testing function has changed when the changed code 326 was introduced to the modified source code 312B. The data structure 324A may also be updated with identifiers of one or more lines of code corresponding to the second function. In some examples, the updating is performed in real-time as the identifiers of the one or more lines of code corresponding to the second function are being traced and reported. This may be accomplished, for example, by programming the listener to output to the data structure 324A.

In some examples, to conserve computing resources and to save time with respect to the updating, the code coverage module 320 first determines if the second function has a corresponding second testing function. The code coverage module 320 may, for example, look up data structure 324A or any other data structure, such as other data structure 324B, for an identifier of the second function 328B and the identifier of the second testing function 330B corresponding to the second function. Examples of identifiers that the code coverage module may look up include file names, function names, hashes, function pointers, etc. If the code coverage module 320 fails to identify the corresponding second testing function, then computing resources are not expended to update data structure 324A/B with the identifiers of the one or more lines of source code corresponding to the second function. Conversely, if the code coverage module 320 succeeds in identifying the corresponding second testing function, then computing resources are expended to update data structure 324A/B with the one or more lines of source code corresponding to the second function.

It will be appreciated that code coverage module 320 makes determining the identifier of the second testing function more convenient for the user, as the user is not required to specifically instruct the code coverage module 320 to search in data structure 324A or other data structure 324B. The code coverage module 320 may include logic for search prioritization, e.g., first search data structure 324A, and if not found, then search other data structure 324B. Other data structure 324B may include, for example, files where the user had previously saved testing functions corresponding to the source code.

Figure 4:
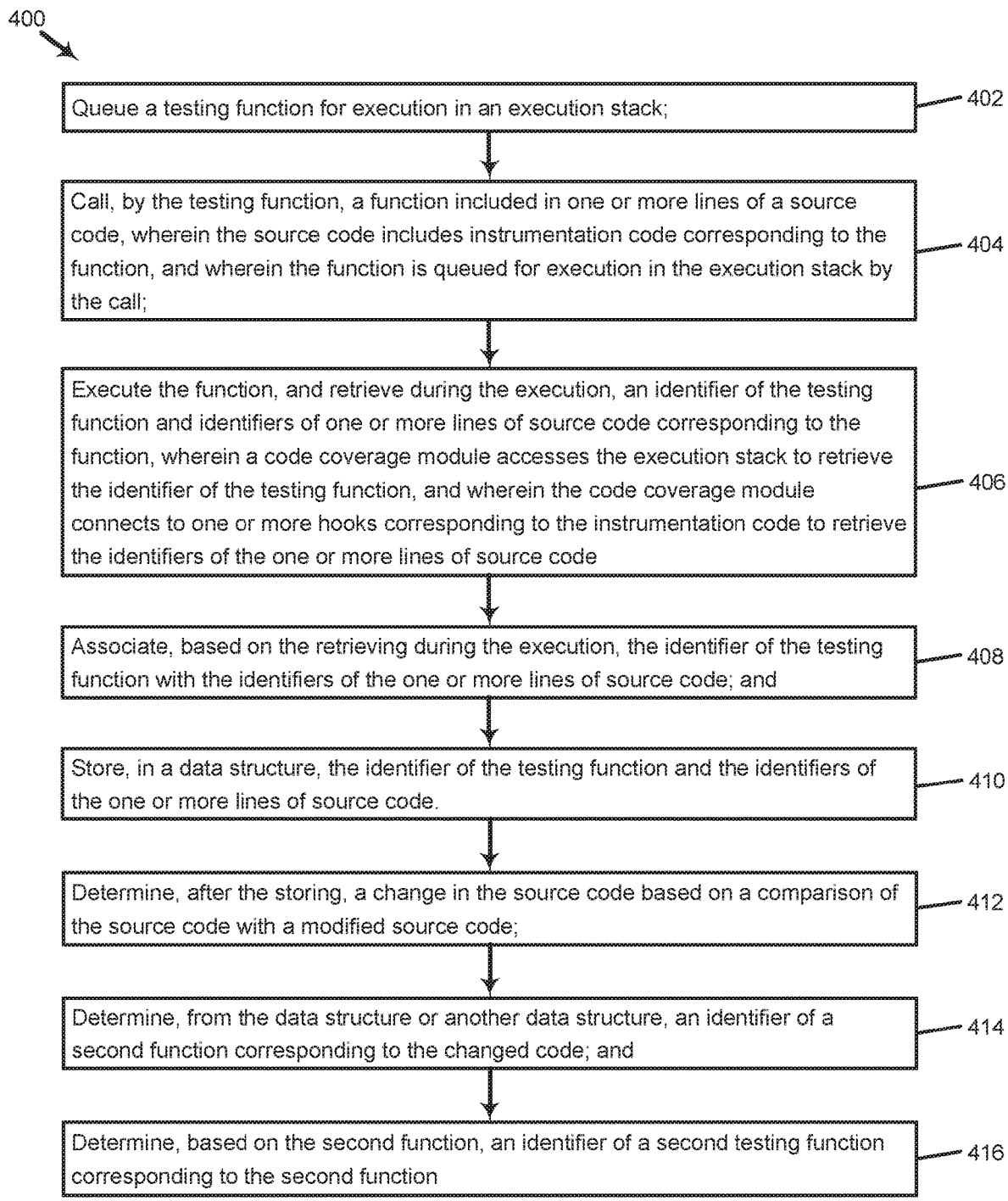
FIG. 4 is a flow diagram illustrating a method performed by a code coverage module to retrieve and store identifiers of a testing function and of one or more lines of source code corresponding to the function being tested, including a determination of an identifier of a testing function corresponding to a changed function, in accordance with various examples of the present disclosure.

FIG. 4 is a flow diagram illustrating a method 400 performed by a code coverage module to retrieve and store identifiers of a testing function and of one or more lines of source code corresponding to the function being tested, including a determination of an identifier of a testing function corresponding to a changed function, in accordance with various examples of the present disclosure. In some examples, the method is performed by executing computer-readable instructions that are stored in non-transitory memory 302 using one or more hardware processors 304 described with respect to FIG. 3. Additional actions may be provided before, during, and after the steps of method 400, and some of the actions described may be replaced, eliminated and/or re-ordered for other examples of the method 400. For example, method 400 may be performed in conjunction with systems 100 and 300 described with respect to FIGS. 1 and 3, and with methods 200 and 500 described with respect to FIGS. 2 and 5.

At action 402, the testing function is queued for execution. In some examples, the testing function is queued and executed immediately, and in other examples the testing function is queued for execution in an execution or calling stack for later execution.

At action 404, the testing function calls a function included in one or more lines of a source code. In some examples, the called function is the function that the testing function was designed to test. In some examples, instrumentation code is injected into the source code to provide information about the function as it is being executed. Examples of the types of instrumentation code that may be injected include tracers, debuggers, performance counters, and event loggers. In some examples, trace switches may be injected before and after a function to turn on and off tracing for that function. In some examples, the trace switches apply to the global call of functions, such that any time a function is executed, the trace switch is turned on, and when the function returns, the trace switch is turned off. In some examples, when the testing function calls the function, the function is queued for execution in the execution stack.

At action 406, the function is executed, and an identifier of the testing function and identifiers of one or more lines of source code corresponding to the function are retrieved. In some examples, the function is executed when the function reaches the top of the execution stack. In some examples, when the function executes, the code coverage module accesses the execution stack, and waits for the executed function to return to the calling function, i.e., the testing function, to retrieve the identifier of the testing function. In some examples, when the function is called by the testing function, the code coverage module accesses the execution stack to identify the testing function. The code coverage module may make a determination or conclude that the calling function at the top of the execution stack is the testing function, and specify that calling function as the testing function.

In some examples, the code coverage module connects to or is connected to one or more hooks of the instrumentation code during the execution of the function to retrieve the identifiers of the one or more lines of source code corresponding to the executed function (e.g., one or more lines of source code where the function is used). In some examples, the identifiers of the one or more lines of source code are output by the instrumentation code to a data structure. In such instances, the code coverage module may not need to connect to the one or more hooks to retrieve the identifiers of the one or more lines of source code corresponding to the executed function, further saving computing resources.

At action 408, the identifier of the testing function is associated with the identifiers of the one or more lines of source code. In some examples, the associating is based on the accessing the execution stack and the connecting to the one or more hooks during the execution of the function. In some examples where the instrumentation code outputs the identifiers of the one or more lines of source code to a data structure, the associating may be based on the synchronous accessing of the data structure and of the execution stack during the execution of the function. Because the output of the identifiers of the one or more lines of source code to the data structure is occurring in real-time as the function is being executed, the code coverage module may accurately conclude that the testing function (which the code coverage module executes and to which the tested function returns) is the testing function corresponding to the identifiers of the one or more lines of source code being output to the data structure. An example of an identifier of a line of source code is a line number corresponding to that line of source code.

At action 410, the identifier of the testing function and the identifiers of the one or more lines of source code are stored in a data structure. In some examples, these are the identifiers that were retrieved or output at action 408. In some examples where the instrumentation code outputs the identifiers of the one or more lines of source code to a data structure, the data structure where the identifier of the testing function is stored may be the same data structure as the data structure storing the instrumentation code output. In some examples, the code coverage module stores the identifier of the testing function in a different data structure, and the code coverage module associates the identifier of the testing function in the different data structure with the data structure where the identifiers of the one or more lines of source code are stored. In some examples, a time stamp is used to indicate the time at which the respective identifiers are stored. The time stamp may be used by the code coverage module to associate the respective identifiers. In some examples, storing refers to storing in volatile memory such as RAM. In some examples, storing refers to storing in non-transitory memory such as non-transitory memory 102 described with respect to FIG. 1.

At action 412, a change in the source code is determined. In some examples, the change in the source code is determined after the storing of action 410. In some examples, the source code is determined based on a comparison of the source code with a modified source code. In some examples, the comparison is performed using a diff or patch function. The diff function may analyze the source code at a character- or line-based level, extracting line differences between a file containing the source code and another file containing the modified source code. The lines found with changed content may be recorded by their line numbers into an output file and include the changed content. The lines in the file may be compared using, for example, a LCS (Longest Common Subsequence) algorithm.

At action 414, an identifier of a second function corresponding to the changed code is determined. In some examples, the identifier of the second function may be determined by querying the data structures described with respect to action 410. In some examples, the identifier of the second function may be determined by querying data structures 324A/B described with respect to FIG. 3. For example, the changed code may include the names of the changed functions. The code coverage module may query the data structures 324A/B for the names of the changed functions, and the code coverage module may receive a search hit on a testing function which includes the name of a changed function, for example, if the testing function is programmed to call the changed function. If the changed function is only included as part of a subroutine of a testing function, the code coverage module may, without user intervention, extract the parts of the testing function specific to the changed function to create a new testing function to test the changed function without testing the rest of the function. Such extraction may save computing resources and time.

Figure 5:
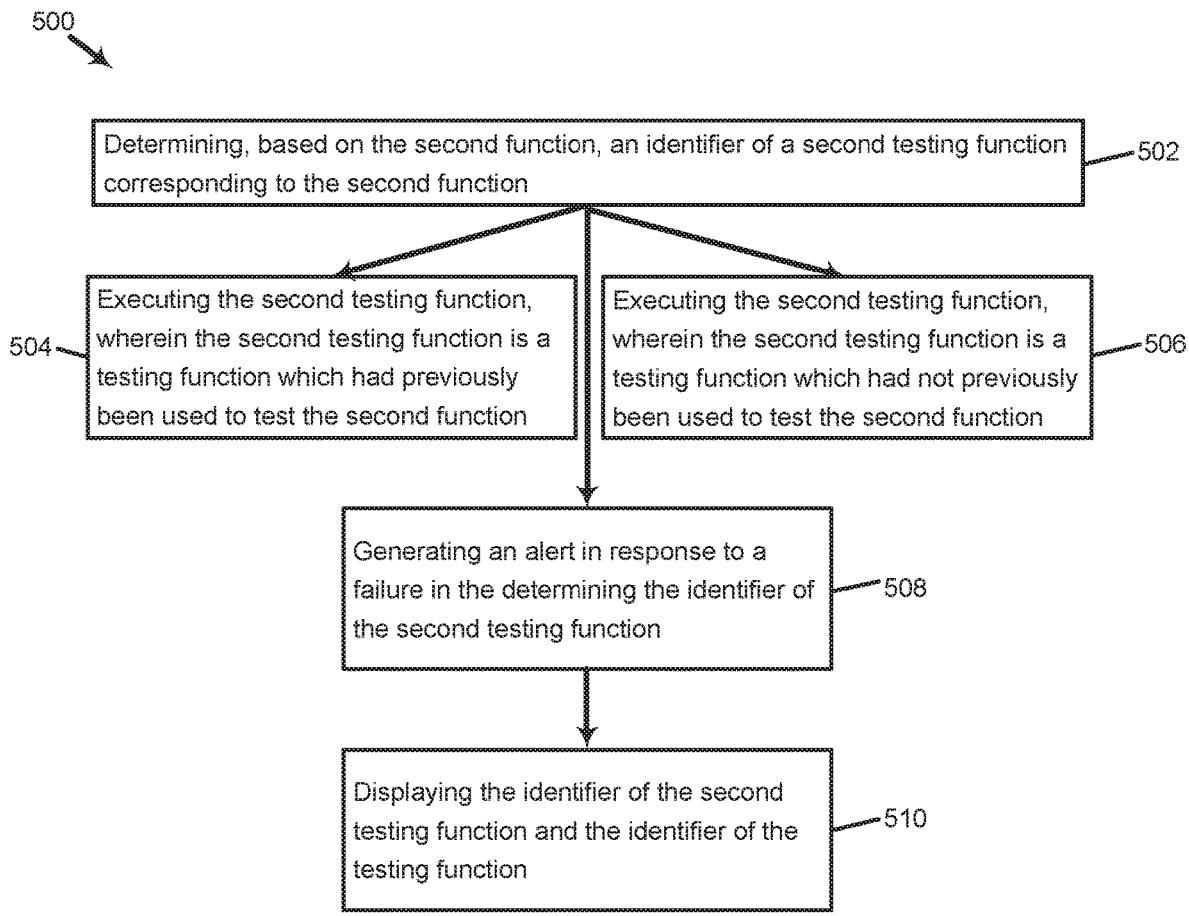
FIG. 5 is a flow diagram illustrating a method performed by a code coverage module after determining an identifier of a testing function corresponding to a changed function, in accordance with various examples of the present disclosure.

FIG. 5 is a flow diagram illustrating a method 500 performed by a code coverage module after determining an identifier of a testing function corresponding to a changed function, in accordance with various examples of the present disclosure. In some examples, the method is performed by executing computer-readable instructions that are stored in non-transitory memory 302 using one or more hardware processors 304 described with respect to FIG. 3. Additional actions may be provided before, during, and after the steps of method 500, and some of the actions described may be replaced, eliminated and/or re-ordered for other examples of the method 500. For example, method 500 may be performed in conjunction with systems 100 and 300 described with respect to FIGS. 1 and 3, and with methods 200 and 400 described with respect to FIGS. 2 and 4.

At action 502, the identifier of the second testing function is determined. In some examples, the identifier of the second testing function is determined based on the second function. Action 502 may be similar to action 416 described with respect to FIG. 4, and may include all the preceding actions of action 416. The second testing function may refer to a testing function corresponding to a changed function ("second function") of a modified source code, as distinguished from a (first) testing function corresponding to the original function of the original source code before the modification.

At action 504, the second testing function is executed. Here, the executed second testing function is a testing function which had previously been used to test the second function. The code coverage module may determine whether a testing function had previously been used to test the second function by using a testing function included in the data structure (e.g., data structure 324A) which stores the identifiers of the testing function during the execution of the testing function. In some examples where the second function is nested within a testing function, the nested portion of the testing function specific to the second function may be extracted to create a testing function testing only the second function. The extraction may be performed if it may result in a net saving of computing resources.

At action 506, the second testing function is executed. In contrast to action 504, the executed second testing function here is a testing function which had not previously been used to test the second function. For example, the changed function may be a new function that is not described or declared anywhere in the original source code. Accordingly a new testing function may have been written specifically for the changed function. The data structure storing the identifiers of the executed testing functions, such as data structure 324A, would therefore not include any information corresponding to the new testing function. In some examples, the tester may store such new functions and their corresponding testing functions in another data structure, such as data structure 324B. The code coverage module may, without user intervention, look up such a data structure, determine the corresponding second testing function, and execute the second testing function.

At action 508, an alert is generated in response to a failure in determining the identifier of the second testing function. Such a failure may occur, for example, when the code coverage module searches data structure 324A and other data structure 324B for the second function and fails to find either the second function or the corresponding second testing function or both. The generated alert may be any perceptible alert, including a visual, audible, or touch-based alert such as a vibration or a tap.

At action 510, the identifier of the second testing function and the identifier of the (original) testing function are displayed. Displaying both the identifiers allows a user to visually compare the effects of the modification in the source code to the functions contained in the source code and to quickly confirm that the correct testing functions are being applied to the changed functions. In some examples, there is no difference in the testing function between the original and the modified source code, i.e., the same testing function is applied to the changed function. However, in other examples, a different testing function is applied. In some examples, to conserve resources and to streamline the process of review by a user, only the identifiers of the second testing function and the testing function are displayed. In some examples, more information, such as identifiers of the function and the second function and their corresponding line numbers, is displayed to provide a more comprehensive view of the changes. In some examples, the changed code itself is also displayed.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method comprising:
   queuing a testing function for execution in an execution stack;
   calling, by the testing function, a function corresponding to one or more lines of a source code, wherein the source code includes instrumentation code corresponding to the function, and wherein the function is queued for execution in the execution stack by the calling;
   executing the function, and retrieving during the executing, identifiers corresponding to the testing function and to the one or more lines of source code, wherein an identifier of the testing function is retrieved from the execution stack, and wherein identifiers of the one or more lines of source code are retrieved by a code coverage module from one or more hooks corresponding to the instrumentation code;
   associating, based on the retrieving during the executing, the identifier of the testing function with the identifiers of the one or more lines of source code; and
   storing, in a data structure, the identifier of the testing function and the identifiers of the one or more lines of source code.

2. The method of claim 1, wherein the code coverage module accesses the execution stack during the executing to retrieve the identifier of the testing function.

3. The method of claim 1, further comprising:
   determining, after the storing, a change in the source code based on a comparison of the source code with a modified source code;
   determining, from the data structure or another data structure, an identifier of a second function corresponding to the changed code; and
   determining, based on the second function, an identifier of a second testing function corresponding to the second function.

4. The method of claim 3, further comprising executing the second testing function.

5. The method of claim 3, wherein the second testing function is a testing function which had previously been used to test the second function.

6. The method of claim 3, further comprising displaying the identifier of the second testing function and the identifier of the testing function.

7. The method of claim 3, further comprising generating an alert in response to a failure in the determining the identifier of the second testing function.

8. A non-transitory machine-readable medium having stored thereon machine-readable instructions executable to cause a machine to perform operations comprising:
   executing a testing function and providing the testing function to an execution stack;
   calling, by the testing function, a function corresponding to one or more lines of a source code, wherein the source code includes instrumentation code corresponding to the function, and wherein the calling queues the function for execution in the execution stack;
   executing the function, and retrieving during the executing, an identifier of the testing function and identifiers of the one or more lines of source code, wherein the identifier of the testing function is retrieved from the execution stack, and wherein the identifiers of the one or more lines of source code are retrieved by a code coverage module from one or more hooks corresponding to the instrumentation code;
   associating, based on the retrieving during the executing, the identifier of the testing function with the identifiers of the one or more lines of source code; and
   storing, in a data structure, the identifier of the testing function and the identifiers of the one or more lines of source code.

9. The non-transitory machine-readable medium of claim 8, wherein the code coverage module accesses the execution stack during the executing to retrieve the identifier of the testing function.

10. The non-transitory machine-readable medium of claim 8, further comprising:
    determining, after the storing, a change in the source code based on a comparison of the source code with a modified source code;
    determining, from the data structure or another data structure, an identifier of a second function corresponding to the changed code; and
    determining, based on the second function, an identifier of a second testing function corresponding to the second function.

11. The non-transitory machine-readable medium of claim 10, further comprising executing the second testing function.

12. The non-transitory machine-readable medium of claim 10, wherein the second testing function is a testing function which had previously been used to test the second function.

13. The non-transitory machine-readable medium of claim 10, further comprising displaying the identifier of the second testing function and the identifier of the testing function.

14. The non-transitory machine-readable medium of claim 10, further comprising generating an alert in response to a failure in the determining the identifier of the second testing function.

15. A computing system comprising:
    a non-transitory memory storing a code coverage module;
    one or more hardware processors coupled to the non-transitory memory and that execute instructions to cause the system to perform operations comprising:
       queuing, by a code coverage module, a testing function for execution in an execution stack;
       executing a call of the testing function, wherein the executed call calls a function corresponding to one or more lines of a source code, wherein the source code includes instrumentation code corresponding to the function, and wherein executing the call of the testing function includes queuing the function for execution in the execution stack;

executing the function, and retrieving during the executing, an identifier corresponding to the testing function and identifiers corresponding to the one or more lines of source code,
- wherein an identifier of the testing function is retrieved from the execution stack, and
- wherein identifiers of the one or more lines of source code are retrieved by a code coverage module from one or more hooks corresponding to the instrumentation code;

associating, based on the retrieving during the executing, the identifier of the testing function with the identifiers of the one or more lines of source code; and storing, in a data structure, the identifier of the testing function and the identifiers of the one or more lines of source code.

16. The system of claim 15, wherein the code coverage module accesses the execution stack during the executing to retrieve the identifier of the testing function.

17. The system of claim 15, further comprising:

determining, after the storing, a change in the source code based on a comparison of the source code with a modified source code;

determining, from the data structure or another data structure, an identifier of a second function corresponding to the changed code; and determining, based on the second function, an identifier of a second testing function corresponding to the second function.

18. The system of claim 17, further comprising executing the second testing function.

19. The system of claim 17, wherein the second testing function is a testing function which had previously been used to test the second function.

20. The system of claim 15, wherein the associating further comprises associating an identifier of the function with the identifier of the testing function and the identifiers of the one or more lines of source code.

* * * * *